United States Patent
Lin

(10) Patent No.: US 8,584,032 B2
(45) Date of Patent: Nov. 12, 2013

(54) SYSTEM AND METHOD FOR CONTROLLING VIRTUAL KEYBOARD OF AN ELECTRONIC DEVICE

(75) Inventor: Chin-Yu Lin, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 135 days.

(21) Appl. No.: 13/273,246

(22) Filed: Oct. 14, 2011

(65) Prior Publication Data

US 2012/0272175 A1  Oct. 25, 2012

(30) Foreign Application Priority Data

Apr. 25, 2011 (TW) ............................. 100114217 A

(51) Int. Cl.
*G06F 3/048* (2013.01)

(52) U.S. Cl.
USPC ............ 715/773; 715/263; 345/157; 345/173

(58) Field of Classification Search
USPC ............................ 715/773, 263; 345/157, 173
See application file for complete search history.

(56) References Cited

U.S. PATENT DOCUMENTS

| | | | | |
|---|---|---|---|---|
| 5,019,806 | A * | 5/1991 | Raskin et al. | 345/160 |
| 5,561,446 | A * | 10/1996 | Montlick | 345/173 |
| 5,815,126 | A * | 9/1998 | Fan et al. | 345/8 |
| 5,835,077 | A * | 11/1998 | Dao et al. | 345/157 |
| 5,999,166 | A * | 12/1999 | Rangan | 345/157 |
| 5,999,950 | A * | 12/1999 | Krueger et al. | 715/263 |
| 6,049,328 | A * | 4/2000 | Vanderheiden | 345/173 |
| 6,098,086 | A * | 8/2000 | Krueger et al. | 715/263 |
| 6,104,384 | A * | 8/2000 | Moon et al. | 345/168 |
| 6,130,665 | A * | 10/2000 | Ericsson | 345/173 |
| 2004/0263476 | A1 * | 12/2004 | Lim et al. | 345/157 |
| 2006/0279542 | A1 * | 12/2006 | Flack et al. | 345/158 |
| 2010/0007613 | A1 * | 1/2010 | Costa | 345/173 |
| 2010/0156798 | A1 * | 6/2010 | Archer | 345/169 |
| 2010/0171635 | A1 * | 7/2010 | Chu | 340/825.69 |
| 2010/0194682 | A1 * | 8/2010 | Orr et al. | 345/156 |
| 2010/0220061 | A1 * | 9/2010 | Bos et al. | 345/169 |
| 2010/0295948 | A1 * | 11/2010 | Xie et al. | 348/175 |
| 2010/0302278 | A1 * | 12/2010 | Shaffer et al. | 345/659 |
| 2011/0078567 | A1 * | 3/2011 | Kim et al. | 715/702 |
| 2012/0013538 | A1 * | 1/2012 | Yu | 345/171 |
| 2012/0047464 | A1 * | 2/2012 | Liu | 715/836 |
| 2012/0147047 | A1 * | 6/2012 | Kim | 345/649 |
| 2012/0229320 | A1 * | 9/2012 | Yu | 341/176 |
| 2012/0229447 | A1 * | 9/2012 | Ronkainen | 345/419 |
| 2012/0272175 | A1 * | 10/2012 | Lin | 715/773 |

* cited by examiner

*Primary Examiner* — Steven Sax
*Assistant Examiner* — David Choi
(74) *Attorney, Agent, or Firm* — Altis & Wispro Law Group, Inc.

(57) ABSTRACT

In a system and method for controlling a virtual keyboard of an electronic device, the virtual keyboard is generated and displayed on a touch screen of the electronic device. The method sets an angle threshold value, a movement amplitude and a movement direction of the virtual keyboard for each tilting angle of the electronic device. When the electronic device is in an edit mode and displays a middle keyboard area of the virtual keyboard, the method records an initial tilting angle and read the tilting angle of the electronic device. The method calibrates the read tilting angle to acquire actual tilting angle according to the initial tilting angle, and confirms the movement amplitude and movement direction of the virtual keyboard according to the actual tilting angle. The virtual keyboard is controlled to move according to the confirmed movement amplitude and towards the confirmed movement direction.

15 Claims, 5 Drawing Sheets

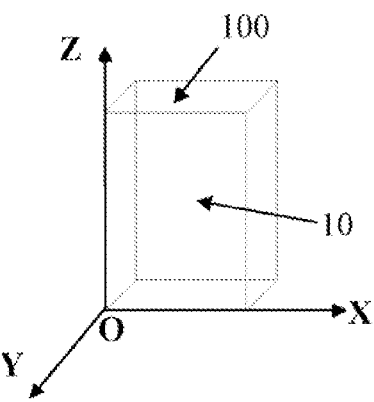
FIG. 2A
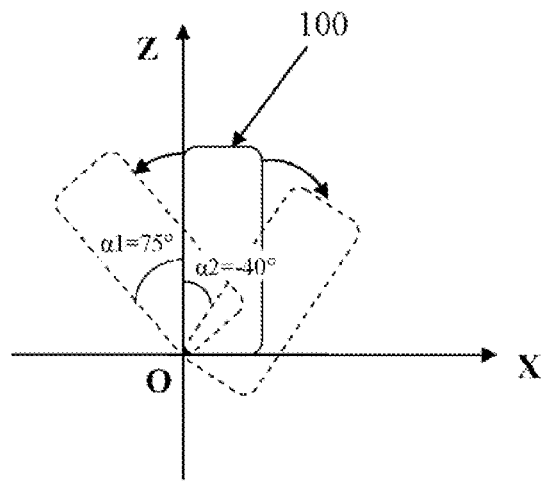
FIG. 2B
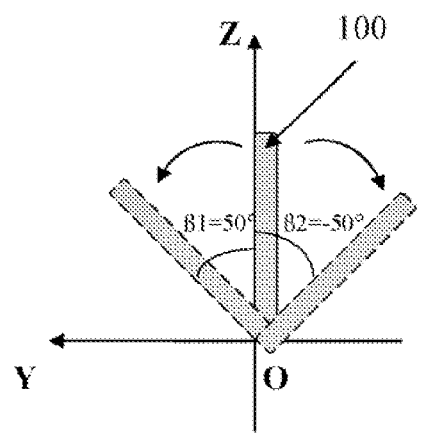
FIG. 2C
FIG. 2

SYSTEM AND METHOD FOR CONTROLLING VIRTUAL KEYBOARD OF AN ELECTRONIC DEVICE

BACKGROUND

1. Technical Field

Embodiments of the present disclosure relate to virtual keyboard display systems and methods, and more particularly to a system and method for controlling a virtual keyboard displayed on a touchscreen of an electronic device.

2. Description of Related Art

Most electronic devices that comprise a touchscreen are may offer a virtual keyboard displayed on the touchscreen. Because these virtual keyboard are limited in size by size of the touchscreen, a virtual key of the virtual keyboard may be too small to select. Operation the virtual keys of the such a virtual keyboard on a touch screen may not be efficient and time may also be wasted.

BRIEF DESCRIPTION OF THE DRAWINGS

FIG. 2A, FIG. 2B and FIG. 2C are schematic diagrams of one embodiment of a predetermined reference orientation and tilting angles of an electronic device of FIG. 1.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
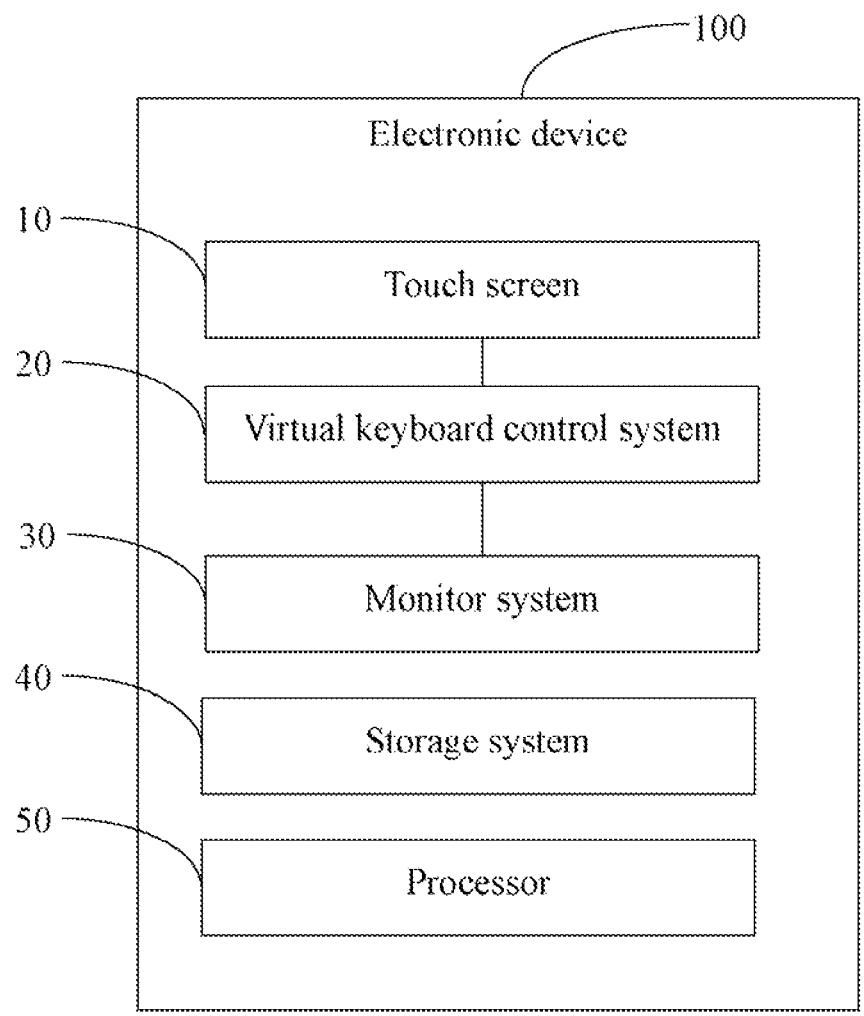
FIG. 1 is a block diagram of one embodiment of an electronic device including a virtual keyboard control system.

FIG. 1 is a block diagram of one embodiment of an electronic device 100 including a virtual keyboard control system 20. The electronic device 100 further includes a touch screen 10 and a monitor system 30. The touch screen 10 displays output of the electronic device 100, such as, displaying a virtual keyboard of the electronic device 100, for example. The monitor system 30 may monitor a tilting angle of the electronic device 100 by a predetermined reference orientation of the electronic device 100. In one embodiment, the monitor system 30 may be a gyroscope or an accelerometer. The virtual keyboard control system 20 may control display of the virtual keyboard or a portion of the virtual keyboard on the touch screen 10 according to the amplitude and direction of movement of the electronic device 100, as measured by the monitor system 30.

FIG. 2A is a schematic diagrams of one embodiment of a predetermined reference orientation and tilting angles of the electronic device 100. For example, the electronic device 100 may be placed on an OXYZ plane. The reference orientation is defined by setting a point in the lower left corner of the touch screen 10 as an origin, the horizontal direction of the touch screen 10 as an x-axis, the vertical direction of the touch screen 10 as a z-axis, and a direction perpendicular to the touch screen 10 as a y-axis. The monitor system 30 monitors the tilting angle of horizontal, or left and right (denoted as the tilting angle $\alpha$), and the tilting angle of vertical, or back and forth, (denoted as the tilting angle $\beta$). As shown in FIG. 2B, when the electronic device 100 is tilted from the reference orientation to the left, the tilting angle $\alpha 1$ is positive, and when the electronic device 100 is tilted from the reference orientation to the right, the tilting angle $\alpha 2$ is negative. As shown in FIG. 2C, when the electronic device 100 is tilted from the reference orientation to forth (towards the user), the tilting angle $\beta 1$ is positive, and when the electronic device 100 is tilted from the reference orientation to back (away from the user), the tilting angle $\beta 2$ is negative.

The electronic device 100 further includes a storage system 40 and at least one processor 50. The storage system 40 stores data of the electronic device 100. The storage system 40 may be a dedicated memory, or an external storage card, such as a smart media card, or a secure digital card. The at least one processor 50 executes one or more computerized codes and other applications of the electronic device 100, to provide the functions of the virtual keyboard control system 20.

Figure 3:
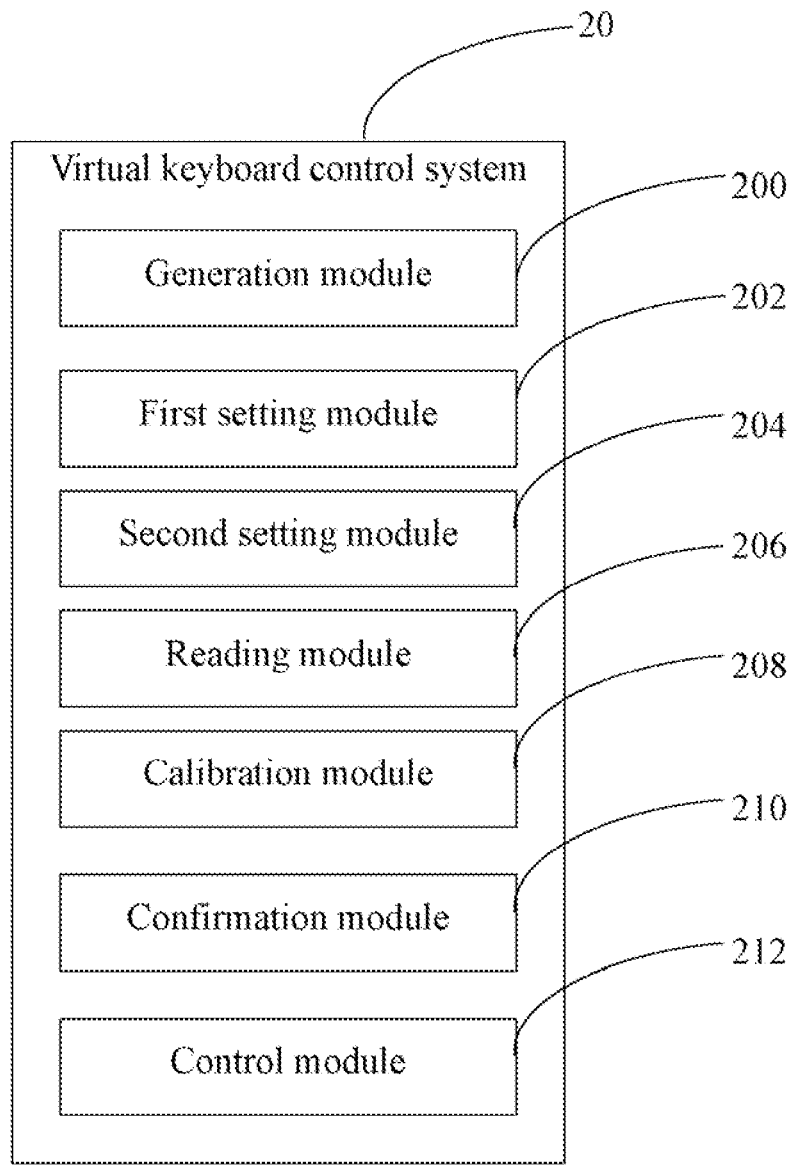
FIG. 3 is a block diagram of function modules of the virtual keyboard control system included in the electronic device of FIG. 1.

FIG. 3 is a block diagram of function modules of the virtual keyboard control system 20 included in the electronic device 100 of FIG. 1. In the embodiment, the virtual keyboard control system 20 may include a generating module 200, a first setting module 202, a second setting module 204, a reading module 206, a calibration module 208, a confirmation module 210, and a control module 212. The modules 200, 202, 204, 206, 208, 210 and 212 comprise computerized codes in the form of one or more programs that are stored in the storage system 40. The computerized code includes instructions that are executed by at least one processor 50 to provide functions for the modules. Details of these operations are as follows.

Figure 4:
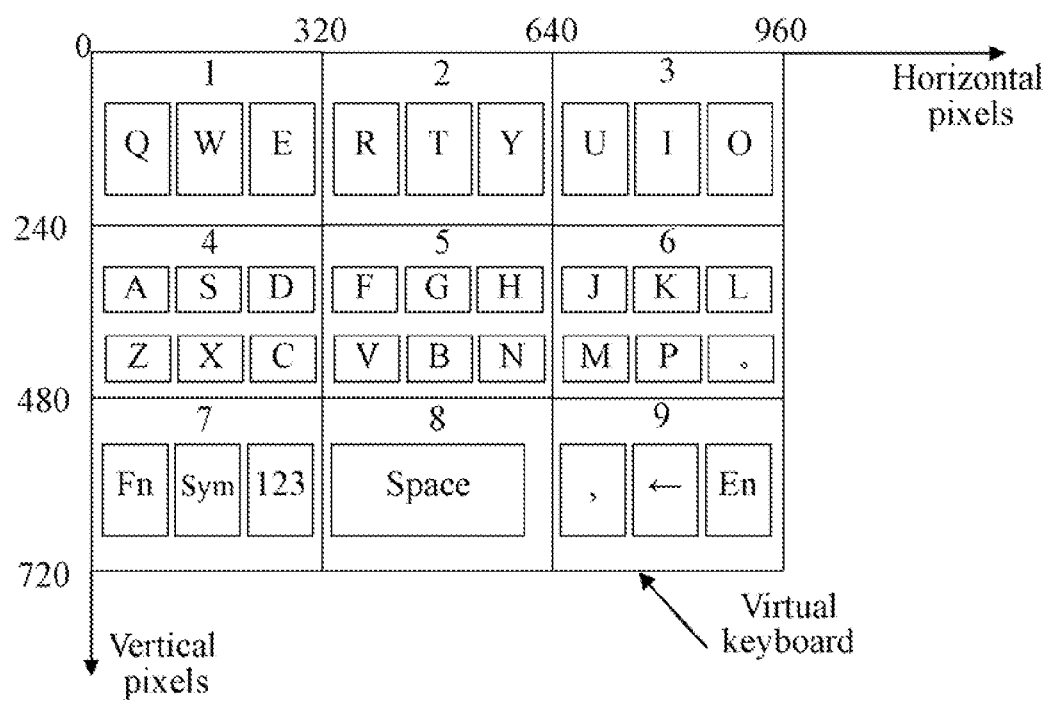
FIG. 4 is a schematic diagram of one embodiment of a virtual keyboard of the electronic device of FIG. 1.

The generating module 200 generates a virtual keyboard including a plurality of virtual keys to display on the touch screen 10, according a display resolution of the touch screen 10. The display resolution includes horizontal pixels (width) and vertical pixels (height). Size of the virtual keyboard is at three times of the display resolution, and the virtual keyboard is divided into nine keyboard areas, each of the keyboard areas displays one part of the virtual keyboard. The virtual keyboard includes all the required a virtual keys, and the distribution and the arrangement of the virtual keys on the virtual keyboard may be configured according to actual input requirements. When the electronic device 100 is in an edit mode, the middle keyboard area of the virtual keyboard is displayed on the touch screen 10. For example, as shown in FIG. 4, if the display resolution of the touch screen 10 is 320*240 pixels, the virtual keyboard includes nine keyboard areas each having 320*240 pixels. The middle keyboard marked with number "5" of the virtual keyboard is initially displayed on the touch screen 10, in one example.

The first setting module 202 sets an angle threshold value $\omega$ to determine whether the virtual keyboard should be controlled to move for displaying each keyboard area of the virtual keyboard. When the tilting angle of the electronic 100 is large than the angle threshold value ω, the virtual keyboard may be controlled to move. In one embodiment, the angle threshold value ω may be set as 35 degrees.

The second setting module 204 sets a movement amplitude and a movement direction of the virtual keyboard for each tilting angle of the electronic device 100. The movement amplitudes may be set according to the display resolution of the touch screen 10. The movement direction may be up, down, left, right, upper left, lower left, upper right or lower right.

In one embodiment, if the tilting angle α is greater than the angle threshold value ω or less than negative of the angle threshold value ω, the movement amplitude is set as the horizontal pixels of the display resolution, and the movement direction is set to be left or right, that is, the virtual keyboard may move with the horizontal pixels towards left or right. If the tilting angle β is greater than the angle threshold value ω or less than the negative angle threshold value ω, the movement amplitude is set as the vertical pixels of the display resolution, and the movement direction of the virtual keyboard is set to be down or up. If both of the tilting angle α and the tilting angle β are greater than the angle threshold value ω or less than the negative angle threshold value ω, the movement amplitudes may include the horizontal pixels and the vertical pixels corresponding to the tilting angle α and the tilting angle β, and the movement direction may be upper left, lower left, upper right or lower right. If the tilting angle α is less than or equal to the angle threshold value ω, and greater than or equal to the negative angle threshold value ω, the virtual keyboard does not move left or right. If the tilting angle β is less than or equal to the angle threshold value ω, and greater than or equal to the negative angle threshold value ω, the virtual keyboard does not move up or down.

As shown in FIG. 4, the touch screen 10 initially displays the keyboard area marked with number "5", and the movement amplitudes include the horizontal pixels of the display resolution corresponding the tilting angle α, and the vertical pixels of the display resolution corresponding the tilting angle β. If the tilting angle α is lager than the angle threshold value ω, and the tilting angle β is less than or equal to the angle threshold value ω and greater than or equal to the negative angle threshold value ω, the movement direction of the virtual keyboard is left, and the keyboard area marked with number "6" may be displayed on the touch screen 10. If the electronic device 100 tilts from the reference orientation to left and forth simultaneously, and both of the tilting angle α and the tilting angle β are greater than the angle threshold value ω, the movement direction of the virtual keyboard is lower left. The display area marked with number "3" (e.g., the top right keyboard area of the virtual keyboard) may be displayed on the touch screen 10.

The reading module 206 records initial tilting angles $α_0$ and $β_0$ of the electronic device 100 when the electronic device 100 enters into the edit mode and the touch screen 10 displays the middle keyboard area of the virtual keyboard. The reading module 206 further reads the tilting angles α and β of the electronic device 100 monitored by the monitor system 30 at a predetermined time interval.

The calibration module 208 calibrates the read tilting angles α and β to acquire actual tilting angles A and B based on the initial tilting angles $α_0$ and $β_0$. In one embodiment, the calibration module 208 acquires the actual tilting angle A by subtracting the initial tilting angle $α_0$ from the monitored tilting angle α, and acquires the actual tilting angle B by subtracting the initial tilting angle $β_0$ from the monitored tilting angle β. For example, the initial tilting angle $α_0$ may be equal to 0 degree, and the initial tilting angle $β_0$ may be equal to 60 degrees when the electronic device 100 enters into the edit mode and displays the middle keyboard area. If the reading module 206 reads the monitored tilting angle α as being equal to 0 degree, and the monitored tilting angle β as being equal to negative 15 degrees, the calibration module 208 acquires the actual tilting angle A as being equal to 0 degree, and the actual tilting angle B as being equal to 45 degrees. That is, the electronic device 100 is tilted forward at a 45 degree angle.

The confirmation module 210 confirms the movement amplitude and movement direction of the virtual keyboard according to the actual tilting angles and the angle threshold value.

The control module 212 controls the virtual keyboard to move according to the confirmed movement amplitude and towards the confirmed movement direction.

Figure 5:
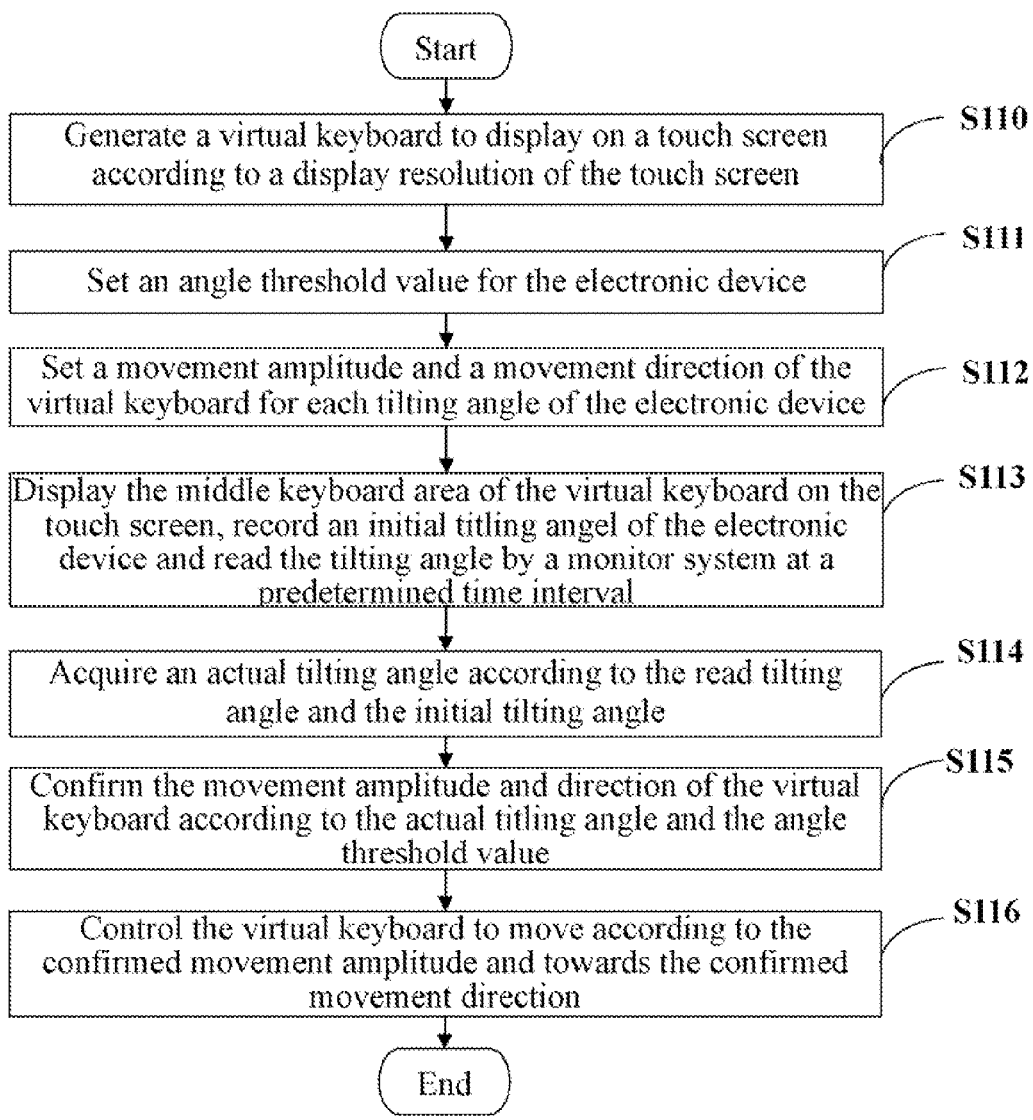
FIG. 5 is a flowchart of one embodiment of a method for controlling a virtual keyboard of an electronic device of FIG. 1.

FIG. 5 is a flowchart of one embodiment of a method for controlling the virtual keyboard of the electronic device 100 of FIG. 1. Depending on the embodiment, additional blocks may be added, others deleted, and the ordering of the blocks may be changed.

In block S110, the generating module 200 generates a virtual keyboard including a plurality of virtual keys to display on the touch screen 10, according to a display resolution of the touch screen 10. Size of the virtual keyboard is at three times of the display resolution, and the virtual keyboard is divided into nine keyboard areas, each of the keyboard areas displays one part of the virtual keyboard.

In block S111, the first setting module 202 sets an angle threshold value ω. When the tilting angle of the electronic 100 is greater than the angle threshold value ω, the virtual keyboard may be controlled to move for displaying one keyboard area of the virtual keyboard on the touch screen 10. In one embodiment, the angle threshold value ω may set as 35 degrees.

In block S112, the second setting module 204 sets a movement amplitude and a movement direction of the virtual keyboard for each tilting angle of the electronic device 100. The movement amplitude may be set according to the display resolution of the touch screen 10. The movement direction may be up, down, left, right, upper left, lower left, upper right and lower right.

In block S113, when the electronic device 100 enters into an edit mode and the touch screen 10 displays the middle keyboard area of the virtual keyboard, the reading module 206 records initial tilting angles $α_0$ and the $β_0$, and reads the tilting angles α and β of the electronic device 100 as monitored by the monitor system 30 at a predetermined time interval, such as 0.5 seconds, for example.

In block S114, the calibration module 208 calibrates the read tilting angles α and the β to acquire actual tilting angles A and B according to the initial tilting angles $α_0$ and the $β_0$. In one embodiment, the calibration module 208 acquires the actual tilting angle A by subtracting the initial tilting angle $α_0$ from the monitored tilting angle α, and acquires the actual tilting angle B by subtracting the initial tilting angle $β_0$ from the monitored tilting angle β.

In block S115, the confirmation module 210 confirms the movement amplitude and movement direction of the virtual keyboard according to the actual tilting angles and the angle threshold value.

In block S116, the control module 212 controls the virtual keyboard to move according to the confirmed movement amplitude and towards the confirmed movement direction.

All of the processes described above may be embodied in, and fully automated via, functional code modules executed by one or more general purpose processors of the electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The embodiments are merely possible examples of implementations, and have been set forth for a clear understanding of the principles of the present disclosure. Many variations and modifications may be made to the-described exemplary embodiments without departing substantially from the spirit and principles of the present disclosure. All such modifications and variations are intended to be included herein within the scope of this disclosure and the described inventive embodiments, and the present disclosure is protected by the following claims.

What is claimed is:

1. A computerized method of an mobile electronic device comprising a touch screen, the method comprising:
    generating a virtual keyboard including a plurality of virtual keys to display on the touch screen according to a display resolution of the touch screen, a size of the virtual keyboard being at three times of the display resolution, and the virtual keyboard being divided into nine keyboard areas, each of the keyboard areas being displayed one at a time, wherein each area occupies the entire touch screen;
    setting an angle threshold value of the electronic device to determine whether the virtual keyboard should be controlled to move;
    setting a movement amplitude and a movement direction of the virtual keyboard for a tilting angle of the electronic device according to the angle threshold value;
    recording an initial tilting angle when the electronic device is in an edit mode and the touch screen displays a middle keyboard area of the virtual keyboard, and reading the tilting angle of the electronic device at a predetermined time interval;
    calibrating the read tilting angle to acquire an actual tilting angle according to the initial tilting angle;
    confirming the movement amplitude and movement direction of the virtual keyboard according to the actual tilting angle and the angle threshold value, wherein the movement amplitude is set as horizontal pixels of the display resolution and the movement direction is set to be left or right, upon the condition that the tilting angle is greater than the angle threshold value or less than a negative angle threshold value and wherein the movement amplitude is set as vertical pixels of the display resolution and the movement direction of the virtual keyboard is set to be down or up, upon the condition that the tilting angle is greater than the angle threshold value or less than the negative angle threshold value; and
    controlling the virtual keyboard to move for displaying another keyboard area of the virtual keyboard according to the confirmed movement amplitude and towards the confirmed movement direction, wherein the movement amplitude and movement direction of each of the nine keyboard areas thus is based on the tilting angle and the angle threshold value.

2. The method as claimed in claim 1, wherein the tilting angle is measured using a gyroscope or accelerometer of the electronic device according to a predetermined reference orientation of the electronic device, the predetermined reference orientation is defined by setting a vertex of right corner of the touch screen as an origin, a horizontal direction of the touch screen as an x-axis, a vertical direction of the touch screen as a z-axis, and a direction perpendicular to the touch screen as a y-axis.

3. The method as claimed in claim 2, wherein the tilting angle of the electronic device comprises:
    a left and right tilting angle $\alpha$ that is a positive value when the electronic device tilts from the reference orientation to left, and is a negative value when the electronic device tilts from the reference orientation to right;
    a back and forth tilting angle $\beta$ that is a positive value when the electronic device tilts from the reference orientation to forth, and is a negative value when the electronic device tilts from the reference orientation to back.

4. The method as claimed in claim 3,
    the movement amplitudes are set as the horizontal pixels corresponding to the tilting angle A, and the vertical pixels corresponding to the tilting angle B, and the movement direction is set as upper left, lower left, upper right or lower right, upon the condition that both of the tilting angle A and the tilting angle B are greater than the angle threshold value or less than the negative angle threshold value.

5. The method as claimed in claim 3, wherein the actual tilting angle is calibrated by subtracting the initial tilting angle from the corresponding read tilting angle.

6. A non-transitory storage medium storing a set of instructions, the set of instructions capable of being executed by a processor of an mobile electronic device, cause the electronic device to perform a method for controlling a virtual keyboard of the electronic device, the method comprising:
    generating the virtual keyboard including a plurality of virtual keys to display on the touch screen according to a display resolution of the touch screen, a size of the virtual keyboard being at three times of the display resolution, and the virtual keyboard being divided into nine keyboard areas, each of the keyboard areas being displayed one at a time, wherein each area occupies the entire touch screen;
    setting an angle threshold value of the electronic device to determine whether the virtual keyboard should be controlled to move;
    setting a movement amplitude and a movement direction of the virtual keyboard for each tilting angle of the electronic device according to the angle threshold value;
    recording an initial tilting angle when the electronic device is in an edit mode and the touch screen displays a middle keyboard area of the virtual keyboard, and reading the tilting angle of the electronic device at a predetermined time interval;
    calibrating the read tilting angle to acquire an actual tilting angle according to the initial tilting angle;
    confirming the movement amplitude and movement direction of the virtual keyboard according to the actual tilting angle and the angle threshold value, wherein the movement amplitude is set as horizontal pixels of the display resolution and the movement direction is set to be left or right, upon the condition that the tilting angle is greater than the angle threshold value or less than a negative angle threshold value and wherein the movement amplitude is set as vertical pixels of the display resolution and the movement direction of the virtual keyboard is set to be down or up, upon the condition that the tilting angle is greater than the angle threshold value or less than the negative angle threshold value; and
    controlling the virtual keyboard to move for displaying another keyboard area of the virtual keyboard according to the confirmed movement amplitude and towards the confirmed movement direction, wherein the movement amplitude and movement direction of each of the nine keyboard areas thus is based on the tilting angle and the angle threshold value.

7. The storage medium as claimed in claim 6, wherein the tilting angle is measured using a gyroscope or accelerometer of the electronic device according to a predetermined reference orientation of the electronic device, the predetermined reference orientation is defined by setting a vertex of right corner of the touch screen as an origin, a horizontal direction of the touch screen as an x-axis, a vertical direction of the touch screen as a z-axis, and a direction perpendicular to the touch screen as a y-axis.

8. The storage medium as claimed in claim 7, wherein the tilting angle of the electronic device comprises:
   a left and right tilting angle $\alpha$ that is a positive value when the electronic device tilts from the reference orientation to left, and is a negative value when the electronic device tilts from the reference orientation to right;
   a back and forth tilting angle $\beta$ that is a positive value when the electronic device tilts from the reference orientation to forth, and is a negative value when the electronic device tilts from the reference orientation to back.

9. The storage medium as claimed in claim 7,
   the movement amplitudes are set as the horizontal pixels corresponding to the tilting angle A, and the vertical pixels corresponding to the tilting angle B, and the movement direction is set as upper left, lower left, upper right or lower right, upon the condition that both of the tilting angle A and the tilting angle B are greater than the angle threshold value or less than the negative angle threshold value.

10. The storage medium as claimed in claim 7, wherein the actual tilting angle is calibrated by subtracting the initial tilting angle from the corresponding read tilting angle.

11. An mobile electronic device, comprising:
    a storage system;
    a touch screen;
    at least one processor; and
    one or more programs that are stored in the storage system and are executed by the at least one processor, the one or more programs comprising:
    a generation module operable to generate a virtual keyboard including a plurality of virtual keys to display on the touch screen according to a display resolution of the touch screen, a size of the virtual keyboard being at three times of the display resolution, and the virtual keyboard being divided into nine keyboard areas, each of the keyboard areas being displayed one at a time, wherein each area occupies the entire touch screen;
    a first setting module operable to set an angle threshold value of the electronic device to determines whether the virtual keyboard should be controlled to move;
    a second setting module operable to set a movement amplitude and a movement direction of the virtual keyboard for each tilting angle of the electronic device according to the angle threshold value;
    a reading module operable to record an initial tilting angle when the electronic device is in an edit mode and the touch screen displays a middle keyboard area of the virtual keyboard, and read the tilting angle of the electronic device at a predetermined time interval;
    a calibration module operable to calibrate the read tilting angle to acquire an actual tilting angle according to the initial tilting angle;
    a confirmation module operable to confirm the movement amplitude and movement direction of the virtual keyboard according to the actual tilting angle and the angle threshold value, wherein the movement amplitude is set as horizontal pixels of the display resolution and the movement direction is set to be left or right, upon the condition that the tilting angle is greater than the angle threshold value or less than a negative angle threshold value and wherein the movement amplitude is set as vertical pixels of the display resolution and the movement direction of the virtual keyboard is set to be down or up, upon the condition that the tilting angle is greater than the angle threshold value or less than the negative angle threshold value; and
    a control module operable to control the virtual keyboard to move for displaying another keyboard area of the virtual keyboard according to the confirmed movement amplitude and towards the confirmed movement direction, wherein the movement amplitude and movement direction of each of the nine keyboard areas thus is based on the tilting angle and the angle threshold value.

12. The electronic device as claimed in claim 11, wherein the tilting angle is measured using a gyroscope or accelerometer of the electronic device according to a predetermined reference orientation of the electronic device, the predetermined reference orientation is defined by setting a vertex of right corner of the touch screen as an origin, a horizontal direction of the touch screen as an x-axis, a vertical direction of the touch screen as a z-axis, and a direction perpendicular to the touch screen as a y-axis.

13. The electronic device as claimed in claim 12, wherein the tilting angle of the electronic device comprises:
    a left and right tilting angle $\alpha$ that is a positive value when the electronic device tilts from the reference orientation to left, and is a negative value when the electronic device tilts from the reference orientation to right;
    a back and forth tilting angle $\beta$ that is a positive value when the electronic device tilts from the reference orientation to forth, and is a negative value when the electronic device tilts from the reference orientation to back.

14. The electronic device as claimed in claim 13,
    the movement amplitudes are set as the horizontal pixels corresponding to the tilting angle A, and the vertical pixels corresponding to the tilting angle B, and the movement direction is set as upper left, lower left, upper right or lower right, upon the condition that both of the tilting angle A and the tilting angle B are greater than the angle threshold value or less than the negative angle threshold value.

15. The electronic device as claimed in claim 13, wherein the actual tilting angle is calibrated by subtracting the initial tilting angle from the corresponding read tilting angle.

* * * * *